REPRODUCING TRANSDUCER FOR MOVING DIELECTRIC RECORD

Filed June 18, 1962

Inventor:
Marvin Camras
BY Soans, Anderson, Luedeka & Fitch ATTYS

United States Patent Office 3,165,580
Patented Jan. 12, 1965

3,165,580
REPRODUCING TRANSDUCER FOR MOVING DIELECTRIC RECORD

Marvin Camras, Glencoe, Ill., assignor to IIT Research Institute, a corporation of Illinois Filed June 18, 1962, Ser. No. 203,326
5 Claims. (Cl. 178—6.6)

The present invention relates to a reproducing system and, more particularly, to a system for reproducing information which has been electrostatically recorded on a dielectric medium.

In a co-pending application, Serial No. 593,542, filed June 25, 1956, now U.S. Patent No. 3,040,124, issued June 9, 1962 of which application this application is a continuation-in-part, systems are disclosed for recording and/or reproducing information. In the recording systems disclosed in the co-pending application, a dielectric record medium is passed between a pair of electrode means. A voltage which is varied in accordance with a signal to be recorded is applied to the electrode means. The magnitude of the voltage is made greater than a threshold value at which an abrupt rise in current flows in the electrode circuit, but less than the breakdown voltage of the medium where spark-through of the record medium begins. Charges are thereby injected into opposite sides of the record medium altering the net charge in minute sub-surface regions thereof.

The resulting internal charge pattern in the record medium produces a relatively high electric field. The internal charge pattern can be repeatedly played back over an extended period of time by passing the record medium in operative relation to a reproducing or playback head, various embodiments of which are disclosed and claimed in the co-pending application. The internal charge pattern cannot be erased by wiping the surface of the record medium, as is the case with prior art surface charge recording. However, erasure of the injected charge pattern may be accomplished, for example, by application of a high intensity electric erasing field. After erasure, the record medium may be re-used.

An object of the present invention is the provision of an additional system for playing back an internal charge pattern previously recorded on a dielectric record medium. Another object of the invention is the provision of a system for reproducing information which has been electrostatically recorded on a dielectric medium. A further object is the provision of a novel playback head which is especially adapted for reproducing previously recorded television signals.

Other objects and advantages of the present invention will become apparent by reference to the following description and accompanying drawings.

Figure 1:
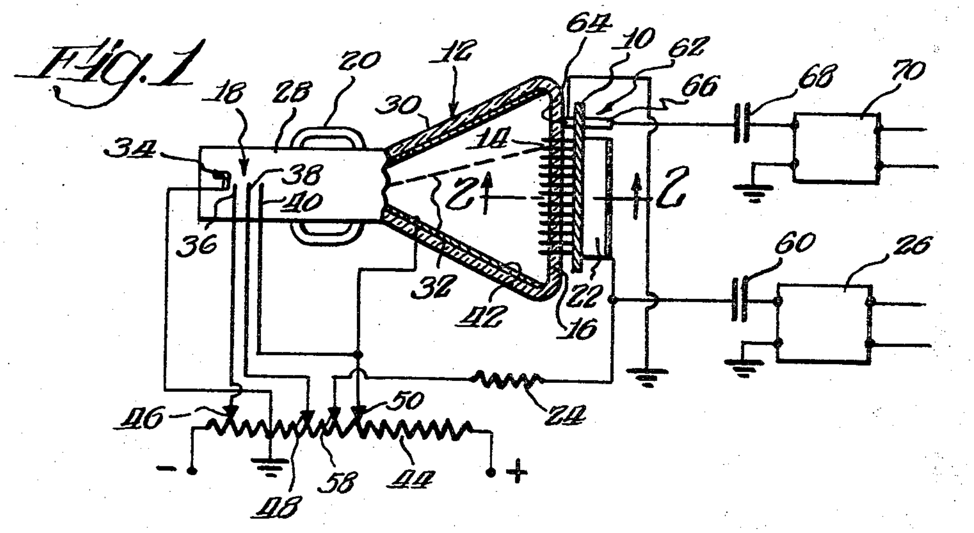
FIGURE 1 is a diagrammatic cross-sectional view of a reproducing system in accordance with the present invention.

As shown in the drawings, a reproduction system is provided for use with a moving dielectric record medium 10 having an internal charge pattern, which represents a signal recorded thereon. The system comprises an evacuated tube 12 having a series of conductors 14 extending through a wall 16 thereof. Electron gun means 18 is provided within the tube 12 for projecting a beam of electrons toward the interior ends of the conductors 14, and means 20 are provided for causing the electron beam to cyclically scan the series of conductors 14. The exterior ends of the conductors 14 are disposed in operative relationship with the charge pattern on the record medium 10. Backing conductor means 22 is disposed on the side of the record medium 10 opposite that cooperating with the series of conductors 14. The backing conductor means 22 is connected to an impedance 24 which, in turn, is coupled to the input of an amplifier 26. The amplifier 26 amplifies variations in current flow through the impedance 24 to thereby produce an electrical signal varying in accordance with the internal charge pattern on the record medium 10.

Figures 2, 3, 4, 5, 6, 7:
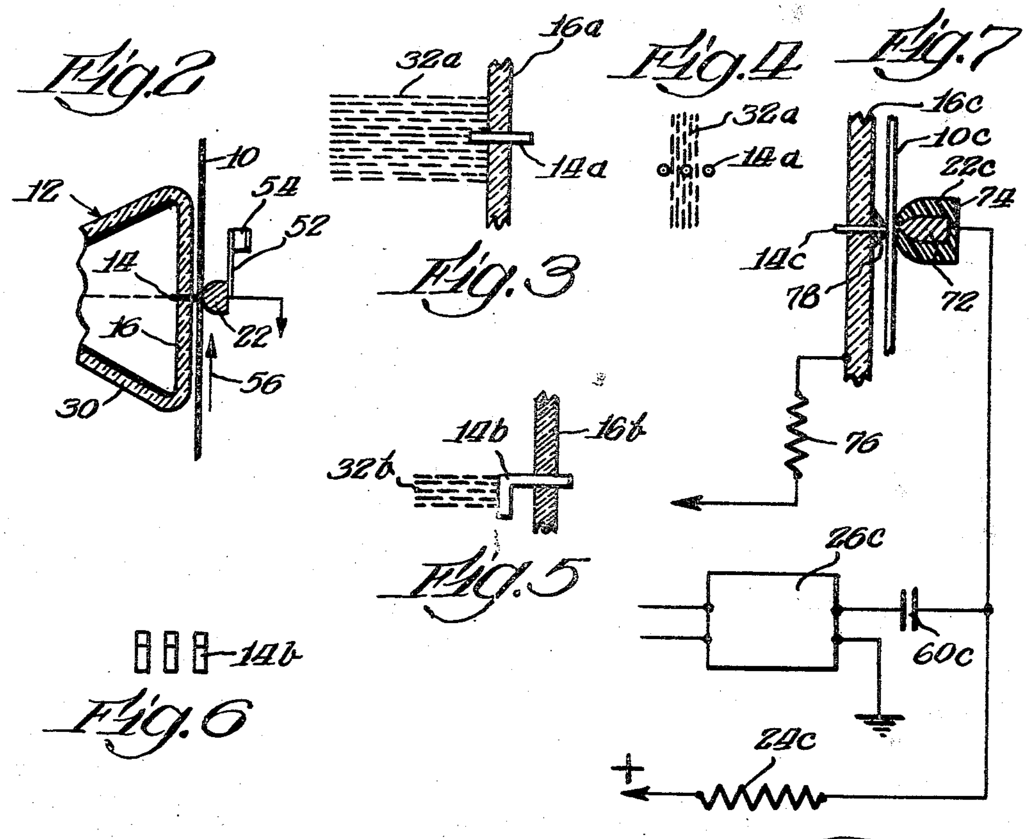
FIGURE 2 is a diagrammatic cross-sectional view taken generally along line 2—2 of FIGURE 1.
FIGURES 3 and 4 are enlarged diagrammatical illustrations of another embodiment of a portion of the system shown in FIGURE 1.
FIGURES 5 and 6 are enlarged diagrammatic illustrations of another embodiment of the portion of the system shown in FIGURES 3 and 4.
FIGURE 7 is an enlarged fragmentary diagrammatic cross-sectional view of another embodiment of a portion of the reproducing system shown in FIGURE 1.

More specifically, the reproducing system shown in FIGURES 1 and 2 particularly is adapted to reproduce television signals which have been previously electrostatically recorded on the dielectric medium 10. The dielectric record medium 10 is in the form of a tape composed of synthetic resin film, such as vinyl chloride-acetate copolymers (known by the trade mark "Vinylite"), polystyrene, polyethylene, cellulose acetate, and polyethylene terepthalate (a polyester film known by the trade mark "Mylar"). Because of its mechanical properties, polyethyleneterepthalate is the preferred material. Such a medium may have a thickness of .00025 inch to .0001 inch.

The television signal is represented on the record medium 10 by an internal charge pattern. The internal charge pattern may be created by the recording systems described and claimed in the aforesaid co-pending application, Serial No. 593,542 now U.S. Patent No. 3,040,124. Likewise, the audio signal which accompanies the television signal, is electrostatically recorded along one edge of the tape 10, by means such as that disclosed in the co-pending application.

As shown in FIGURE 1, the reproducing system includes the tube 12 which is constructed of a non-conductive material in the conventional manner and is suitably evacuated. The tube 12 includes a generally cylindrical neck portion 28 and a conical head portion 30 connected at its smaller end to one end of the neck portion 28. The electron gun means 18 which may be of the conventional type, is disposed in the neck portion 28 of the tube so as to direct an electron beam (indicated diagrammatically at 32) at the interior surface of the base or end wall 16 of the head portion 30 of the tube 12. The illustrated electron gun means 18 includes an indirectly heated cathode 34, which serves as a supply of electrons, a control grid 36 for controlling the intensity of the electron beam, and accelerating and focusing anodes 38 and 40 for producing a relatively narrow beam of relatively high intensity. The electron beam is further accelerated by an anode 42 formed by coating the interior surface of the side wall of the head portion 30 with a conductive coating. This coating 42 also serves to collect secondary electrons.

Potential is provided for the elements of the electron gun means 18 by a suitable power supply. In the illustrated embodiment, the power supply includes a resistor 44 across which a high D.-C. potential is applied. The resistor 44 is grounded intermediate its ends. The cathode 34 is grounded by connecting the same to the grounded point on the resistor 44. The control grid 36 is negatively biased by connecting the same to a slidable tap 46 disposed on the negative side of the resistor 44. The accelerating and focusing anodes 38 and 40 are provided with suitable positive potentials by connecting the same to sliding taps 48 and 50, respectively, on the resistor 44. The coating 42 is connected to the sliding tap 50.

As shown in FIGURES 1 and 2, the end wall 16 of the tube 12 is provided with the series of conductors 14 which, in the illustrated embodiment, are a series of fine conductive wires which extend through the wall 16 of the tube 12. The wires 14 are aligned generally in a straight line. The wires 14 may be formed by photo-etching the end wall and then vacuum depositing a suitable material, such as indium or indium solder, in the holes. The spacing between adjacent wires 14 is preferably on the order of the diameter or transverse extent of the wires 14 themselves.

As shown in FIGURES 1 and 2, the record medium 10 is pressed against the exterior ends of the wires 14 by the backing electrode means 22 which extends across the tape 10 from the last wire to the first wire. The backing electrode means 22 is resiliently biased toward the wires 14 by a spring arm 52 secured to a fixed support 54. The backing electrode means 22 is adjusted to have its center line exactly opposite or in line with the row of wires 14.

Preferably, the backing electrode means 22 is made of a non-conductive, resilient material, such as felt, which is impregnated with a conductive material, such as graphite. Such a backing electrode means 22 ensures efficient contact between the record medium 10 and each of the wires 14. This provides a better reproduction, in that a higher signal-to-noise ratio is obtained. Without such a resilient backing electrode means, the tape 10, whch normally has a relatively rough surface, does not make efficient contact with the wires 14 and, hence, results in considerable noise during reproduction. The resilient electrode means 22 also permits free passage of tape splices, markers, etc. However, for certain applications where a reduced quality of the reproduction is acceptable, the backing electrode means 22 may be made of solid conductive material, resilient metal fiber, etc.

The dielectric tape 10 is moved relative to the wires 14 in a direction generally at a right angle to the row of wires, as indicated by the arrow 56 in FIGURE 2, by a suitable means such as a capstan and pressure roller (not shown). Preferably the tape 10 is moved at the same speed as it was moved during recording.

The moving tape 10 is preferably firmly supported near the wires 14 to prevent vibration of the tape and, hence, vibration of surface charges on the tape. Such vibrations introduce a noise signal into the reproduced signal. To avoid piezo-electric effects, which would add noise voltages to the reproduced signal, playback is preferably carried on at room temperature, and the record medium is maintained in a substantially unstressed condition.

As shown in FIGURES 1 and 2, the electron beam 32 is deflected by suitable electromagnetic coils 20 disposed on the neck portion 20 of the tube 12. The coils 20 are connected to a power supply (not shown) which causes the electron beam to cyclically scan the interior ends of the series of wires 14. The scanning speed is made equal to the scanning speed employed in recording the information.

In the illustrated embodiment, the backing electrode means 22 is connected through the impedance 24 which is a resistor, to a positive potential provided by a sliding tap 58 on the power supply resistor 44. The potential of the backing electrode means 22 is preferably set at a potential near that of the beam, with the beam not impinging on any of the wires. As the beam scans the interior ends of the row of wires 14, it acts as a switch connecting the individual wires 14 into the circuit. The beam impinging on a wire 14, tends to set the potentials of that wire 14 at a definite value (i.e., the potential of the beam). The electric field established by the internal charges in the tape 10 associated with that wire 14 raises or lowers this value. Since the voltage applied to one side of the resistor 24 is substantially constant, the potential of the backing electrode means 22 and hence the voltage drop across the resistor 24 varies in a corresponding manner. The variation in potential across the resistor 24 is amplified by the amplifier 26 whose input is connected through a coupling capacitor 60 to the resistor 24. The amplifier 26 is preferably of a low input capacitance type. The amplifier 26, in turn, is coupled to conventional circuits (not shown) for utilizing the reproduced signal.

As shown in FIGURE 1, an audio reproducing head 62 is provided for reproducing the audio track on the edge of the tape. The illustrated audio reproducing head 62 is disposed in lateral alignment with the row of wires 14 and includes a backing knife edge electrode 64 in contact with one surface of the tape 10 and a frontal knife edge electrode 66 in contact with the opposite surface of the tape 10. The backing electrode 64 is suitably grounded and the frontal electrode 66 is connected through a coupling capacitor 68 to the input of a suitable audio amplifier 70. The audio amplifier 70 is coupled to other audio circuits (not shown) for utilizing the audio signal.

Noise due to surface charges on the tape may be reduced prior to playback by suitable means, such as a discharging electrode (not shown) spaced from the tape which electrode is coupled to a high potential. D.-C. voltages of both polarities and high frequency A.-C. voltages up to about 2,000 volts may be used. A source (not shown) of intense ultraviolet light may be employed in conjunction with the electrode, so that the air surrounding the electrode is ionized more easily and conducts charges from the electrode to the tape of neutralize the surface charge. Also a grounded electrode (not shown) may be disposed in contact with the tape.

FIGURES 3 and 4 illustrate a modification of a portion of the embodiment shown in FIGURES 1 and 2. Parts similar to those in FIGURES 1 and 2 are indicated with the same reference numeral with the subscript "*a*." In this modification, the electron beam **32*a* is established so as to have a generally rectangular cross section, as shown in FIGURE 4. The extent of the beam in the direction of deflection is such as to impinge only on one of the wires 14*a*. However, the extent of the beam in a direction transverse of the direction of deflection is made many times the spacing between wires 14*a* so that, in spite of possible fluctuations in the transverse positioning of the beam, it impinges on the wires 14*a*.**

Alternately, as illustrated in FIGURES 5 and 6, each of the wires is provided with a down-turned interior end portion. In this embodiment, wherein parts similar to those shown in FIGURES 1 and 2 are indicated with the same reference numerals with the subscript "*b*," the wires **14*b* have a square cross section. Such wires 14*b*** are used with a generally rectangular electron beam.

In the embodiment shown in FIGURE 7 wherein parts similar to those shown in FIGURES 1 and 2 are indicated with the same numerals with the subscript "*c*," the backing electrode means **22*c* includes a knife edge member 72 having its edge extending laterally of the tape 10*c* and aligned with the row of wires 14*c*. Suitable means (not shown) are provided for biasing the knife edge 72 against the tape 10*c*. To reduce noise voltages, the knife edge electrode 72 is embedded in a casing 74** of insulating material, such as polystyrene, Mylar, epoxy resin, etc.

The end wall **16*c* of the tube in FIGURE 7 is made of a material of relatively high resistivity. The high resistivity material provides a high resistance leakage path for any charge which may accumulate on the wires 14*c*. The semi-conductive wall 16*c* is connected through a resistor 76** to a source of positive potential (not shown).

As shown in FIGURE 7, the exterior end portions of the wires **14*c* are embedded in an insulating material 78**, such as epoxy resin, glass, etc. This reduces noise voltages in the reproduced signal.

Various changes and modifications may be made in the above described reproducing system without departing or deviating from the spirit or scope of the present invention. Various features of the present invention are set forth in the accompanying claims.

What is claimed is:

1. In a reproduction system for use with a moving dielectric record medium having an internal charge pattern representing the signal recorded thereon, comprising an evacuated tube, a series of conductors extending through a wall of said tube, electron gun means within said tube for projecting a beam of electrons having a preselected potential at the interior ends of the conductors, means causing said beam to cyclically scan the interior ends of said series of conductors, backing electrode means engaging said record medium and pressing the same against said series of conductors, a source of D.-C. potential connected to said electron gun means and to said backing electrode means for biasing said electrode means at approximately the potential of the beam of electrons, an impedance connected in series with said backing electrode means, and means connected to said impedance for amplifying variations produced therein by the electric charge pattern in said record medium.

2. In a reproduction system for use with a moving dielectric record medium having an internal charge pattern representing the signal recorded thereon, comprising an evacuated tube, a series of conductors extending through a wall of said tube and receiving the record medium at the exterior ends thereof in operative relation thereto, said wall being made of semiconductive material, a source of positive potential connected to said wall, electron gun means within said tube for projecting a beam of electrons at the interior ends of the conductors, means causing said beam to cyclically scan the interior ends of said series of conductors, backing electrode means disposed on the side of the record medium opposite that cooperating with said series of conductors, and means connected to said backing electrode means for amplifying variations produced therein by the electric charge pattern in said record medium.

3. In a reproduction system for use with a moving dielectric record medium having an internal charge pattern representing the signal recorded thereon, comprising an evacuated tube, a row of spaced apart conductors extending through a wall of said tube, electron gun means within said tube for projecting a generally rectangular beam of electrons at the interior ends of the conductors, the larger dimension of said recmtangular beam being disposed at an angle to the row of conductors and the smaller dimension being comparable to the distance between conductors, means causing said beam to cyclically scan the interior ends of said row of conductors, backing electrode means engaging said medium and pressing the same against the exterior ends of said conductors, a source of D.-C. potential connected to said electron gun means and to said backing electrode means for biasing said electrode means at approximately the potential of the beam of electrons, and means connected to said backing electrode means for amplifying variations produced therein by the electric charge pattern in said record medium.

4. In a reproduction system for use with a moving dielectric record medium having an internal charge pattern representing the signal recorded thereon, comprising an evacuated tube, a row of spaced apart wires extending through a wall of said tube, the interior portions of the wires being bent at an angle to the remainder of the wires, electron gun means within said tube for projecting a generally rectangular beam of electrons at the interior ends of the wires, the larger dimension of said rectangular beam being disposed at an angle to the row of wires and the smaller dimension being comparable to the distance between wires, means causing said beam to cyclically scan the interior ends of said row of wires, backing electrode means engaging said medium and pressing the same against the exterior ends of said wires, a source of D.-C. potential connected to said electron gun means and to said backing electrode means for biasing said electrode means at approximately the potential of the beam of electrons, and means connected to said backing electrode means for amplifying variations produced therein by the electric charge pattern in said record medium.

5. In a reproduction system for use with a moving dielectric record medium having an internal charge pattern representing the signal recorded thereon, comprising an evacuated tube, a series of wires extending through a wall of said tube, the exterior end portions of the wires being embedded in insulating material, electron gun means within said tube for projecting a beam of electrons at the interior ends of the wires, means causing said beam to cyclically scan the interior ends of said series of wires, backing electrode means engaging said medium and pressing the same against the exterior face of said wires, said backing electrode means including a conductive electrode being shaped with a knife edge aligned with the wires, and a casing of insulating material embedding said electrode, a source of D.-C. potential connected to said electron gun means and to said backing electrode means for biasing said electrode means at approximately the potential of the beam of electrons, and means connected to said backing electrode means for amplifying variations produced therein by the electric charge pattern in said record medium.

References Cited in the file of this patent

UNITED STATES PATENTS

| | | |
|---|---|---|
| 2,733,379 | Groendijk | Jan. 31, 1956 |
| 2,976,354 | Banning | Mar. 21, 1961 |